United States Patent
Romero Sanz et al.

(10) Patent No.: US 9,097,235 B2
(45) Date of Patent: Aug. 4, 2015

(54) WIND TURBINE CONTROL METHODS AND SYSTEMS FOR COLD CLIMATE AND LOW ALTITUDE CONDITIONS

(75) Inventors: Ignacio Romero Sanz, Madrid (ES); Jose Maria Lopez Rubio, Madrid (ES); Jesus Javier Guerrero Carrion, Madrid (ES); Borja Molera Llorente, Madrid (ES); Felipe Palou Larrañaga, Sarriguren (ES); Jose Raul Nova Ramos, Madrid (ES)

(73) Assignee: GAMESA INNOVATION & TECHNOLOGY, S. L., Sarriguren (Navarra) (ES)

( * ) Notice: Subject to any disclaimer, the term of this patent is extended or adjusted under 35 U.S.C. 154(b) by 574 days.

(21) Appl. No.: 13/473,093

(22) Filed: May 16, 2012

(65) Prior Publication Data

US 2012/0299298 A1 Nov. 29, 2012

(30) Foreign Application Priority Data

May 24, 2011 (ES) .................................. 201100577

(51) Int. Cl.
 *F03D 7/04* (2006.01)
 *F03D 7/02* (2006.01)
(52) U.S. Cl.
 CPC ........... *F03D 7/0276* (2013.01); *F05B 2270/32* (2013.01); *F05B 2270/324* (2013.01); *F05B 2270/325* (2013.01); *Y02E 10/723* (2013.01)
(58) Field of Classification Search
 None
 See application file for complete search history.

(56) References Cited

U.S. PATENT DOCUMENTS

| | | | | |
|---|---|---|---|---|
| 7,023,105 | B2* | 4/2006 | Wobben | 290/44 |
| 7,420,289 | B2* | 9/2008 | Wang et al. | 290/44 |
| 7,883,317 | B2* | 2/2011 | Ormel et al. | 416/1 |
| 8,120,194 | B2* | 2/2012 | Hoffmann et al. | 290/44 |
| 8,478,449 | B2* | 7/2013 | Hernandez Mascarell | 700/287 |
| 8,738,192 | B2* | 5/2014 | Uphues et al. | 700/287 |
| 2003/0185665 | A1* | 10/2003 | Hansen | 415/1 |
| 2004/0108732 | A1* | 6/2004 | Weitkamp | 290/55 |
| 2004/0135375 | A1* | 7/2004 | Wobben | 290/44 |

(Continued)

FOREIGN PATENT DOCUMENTS

ES 2358140 B1 * 5/2011

OTHER PUBLICATIONS

"Altitude air pressure calculator," Kenneth Baillie, Apr. 2010, http://www.altitude.org/air_pressure.php.*

*Primary Examiner* — Darrin Dunn
*Assistant Examiner* — Christopher E Everett
(74) *Attorney, Agent, or Firm* — Ladas & Parry LLP

(57) ABSTRACT

A method for the operation of a variable-speed wind turbine having pitch and torque control means that includes additional steps for providing to the torque control means, in case of an environmental situation where the air density $\rho$ is greater than a predetermined value $\rho_{ref}$, i.e. a situation combining low temperature and low height, a reduced nominal generator speed $\Omega_{nr}$, instead of the rated nominal generator speed $\Omega_n$, which is determined dynamically as a function of at least the air pressure Pr, the temperature T and the wind speed V, for decreasing the wind turbine loading. The invention also refers to a control system arranged for performing said regulation.

13 Claims, 3 Drawing Sheets

(56) References Cited

U.S. PATENT DOCUMENTS

| | | | |
|---|---|---|---|
| 2007/0183885 A1* | 8/2007 | Ormel et al. | 415/4.1 |
| 2008/0112807 A1* | 5/2008 | Uphues et al. | 416/1 |
| 2008/0118354 A1* | 5/2008 | Jeppesen et al. | 416/1 |
| 2008/0140263 A1* | 6/2008 | Wang et al. | 700/291 |
| 2008/0170941 A1* | 7/2008 | Ghosh et al. | 416/121 |
| 2009/0066089 A1* | 3/2009 | Arinaga et al. | 290/55 |
| 2009/0295160 A1* | 12/2009 | Wittekind et al. | 290/44 |
| 2010/0320761 A1* | 12/2010 | Schwarze et al. | 290/44 |
| 2011/0148112 A1* | 6/2011 | Ormel et al. | 290/44 |
| 2012/0205913 A1* | 8/2012 | Garcia Andujar et al. | 290/44 |
| 2012/0271593 A1* | 10/2012 | Uluyol et al. | 702/179 |

\* cited by examiner

WIND TURBINE CONTROL METHODS AND SYSTEMS FOR COLD CLIMATE AND LOW ALTITUDE CONDITIONS

CROSS REFERENCE TO THE CORRESPONDING APPLICATION

This application claims the benefit of Spanish Patent Application No. P201100577 filed on May 24, 2011, the contents of which are incorporated herein by reference.

FIELD OF THE INVENTION

The invention relates to wind turbine control methods and systems and in particular to wind turbine control methods and systems for low height sites at cold climate conditions.

BACKGROUND

As wind turbine control systems are initially designed for standardized environmental conditions they can be improved to cope with non-standard conditions related for instance to wind speed and turbulence intensity in connection with a variety of objectives such as increasing the power production or avoiding excessive loads.

It is known in this respect to take into account other meteorological variables in the operation of wind turbines such as the air pressure or the air temperature as disclosed, for instance, in US 2009/0295160 and US 2010/00320761.

However there are not known wind turbine control systems addressed specifically to sites combining low temperature with low height which are susceptible of having higher air density than usual and where therefore certain increase on wind turbine loading can be expected.

As there are a great number of wind turbines installed in such type of sites and a great number of potential sites of said type for wind turbines it is desirable to have wind turbine control methods and systems solving the loading problems raised in them because, on the one hand, those known method and systems having means for controlling wind turbine loads are not generally well adapted to said type of sites and, on the other hand, are not easily applicable to already installed wind turbines without load measuring devices.

The present invention is therefore addressed to the attention of said demand.

SUMMARY OF THE INVENTION

It is an object of the present invention to provide wind turbine control methods and systems adapted to the needs of wind turbine sites combining low temperature with low height.

In one aspect this and another objects is met by a method for the operation of a variable-speed wind turbine having pitch and torque control means that include additional steps for providing to the torque control means, in case of an environmental situation where the air density $\rho$ is greater than a predetermined value $\rho_{ref}$, a reduced nominal generator speed $\Omega_{nr}$, instead of the rated nominal generator speed $\Omega_n$, which is determined dynamically as a function of at least the air pressure Pr, the temperature T and the wind speed V for decreasing the wind turbine loading.

In embodiments of the present invention, the determination of said reduced nominal generator speed $\Omega_{nr}$ comprises steps of: calculating dynamically the air density $\rho$; obtaining a reduction parameter P depending on the value of the air density $\rho$; obtaining a reduction factor F as a function of said reduction parameter P and of the wind speed V; applying said reduction factor F to the nominal generator speed $\Omega_n$. Therefore the reduced nominal generator speed $\Omega_{nr}$ is made dependant of the air density $\rho$ and of the wind speed V in a way that takes into account its combined influence on the wind turbine loading.

In embodiments of the present invention the wind speed V is measured at the wind turbine and the temperature T and the air pressure Pr can be measured at the wind turbine and/or outside the wind turbine (for example in the wind park to which the wind turbine belongs). As the air pressure Pr is only dependant of the height its value can also be stored as a data at the storing means of the wind turbine control system. Having available more than one source for the values of the temperature T and the air pressure Pr prevents failures in any of them. Therefore the implementation of the additional regulation according to the present invention is done using signals easily available at the wind turbine which allows a simple and robust implementation of said additional regulation.

In embodiments of the present invention said predetermined value $\rho_{ref}$ is 1,225 kg/m³. The additional regulation according to the invention is therefore implemented when the air density reaches a value that overloads a significant proportion of wind turbine models.

In embodiments of the present invention the reduced nominal generator speed $\Omega_{nr}$ is comprised between the 70-99.9% of the rated nominal generator speed $\Omega_n$. The additional regulation according to the invention provides therefore the load reduction needed in the above-mentioned environmental condition with a reasonable reduction of the nominal generator speed.

In another aspect, the above mentioned objects are met by a wind turbine control system connected to measuring devices of at least the generator speed $\Omega$, the pitch angle $\theta$, the temperature T and the wind speed V, and to at least to pitch and torque control actuators, the control system being arranged for performing a regulation of the wind turbine according to a predetermined Power vs. Generator speed curve with a nominal generator speed $\Omega_n$; the control system being also arranged for performing an additional regulation when the air density $\rho$ is greater than a predetermined value $\rho_{ref}$ according to a Power vs. Generator speed curve with a reduced nominal generator speed $\Omega_{nr}$, which is determined dynamically as a function of at least the air pressure Pr, the temperature T and the wind speed V, for decreasing the wind turbine loading.

In embodiments of the present invention the arrangement for performing said additional regulation comprises a module for obtaining said reduced nominal generator speed $\Omega_{nr}$, the module comprising: a first sub-module for calculating dynamically the air density $\rho$ as a function of the pressure Pr and the temperature T; and a second sub-module for obtaining the reduced nominal generator speed $\Omega_{nr}$ applying a reduction factor F to the nominal generator speed $\Omega_n$, said reduction factor F being calculated as a function of a reduction parameter P, depending on the value of the air density $\rho$, and of the wind speed V. Therefore the additional regulation can be easily implemented in the wind turbine control system.

In embodiments of the present invention, the wind turbine control system is also connected to a measuring device of the air pressure Pr. On the other side the measuring devices of the air pressure Pr and the temperature T can be placed at the wind turbine or outside the wind turbine (for example in the wind park to which the wind turbine belongs). Therefore the wind turbine control system has redundant means for providing the inputs to the additional regulation.

A wind turbine comprising the above-mentioned control system is also covered by the scope of the present invention.

Other features and advantages of the present invention will be understood from the following detailed description of illustrative and by no means limiting embodiments of its object in relation with the enclosed drawings.

DETAILED DESCRIPTION OF PREFERRED EMBODIMENTS

Figure 1:
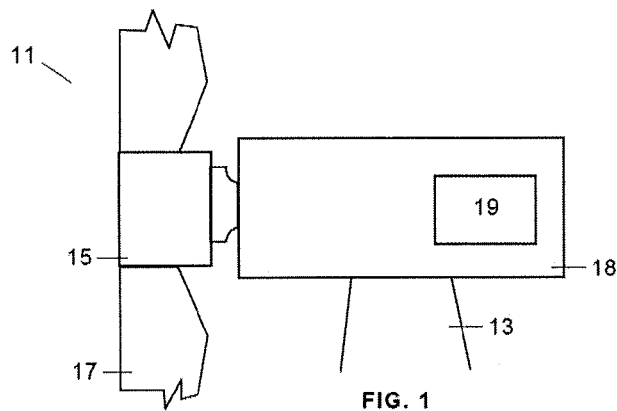
FIG. 1 is a schematic section side view of a wind turbine.

A typical wind turbine 11 comprises a tower 13 supporting a nacelle 21 housing a generator 19 for converting the rotational energy of the wind turbine rotor into electrical energy. The wind turbine rotor comprises a rotor hub 15 and, typically, three blades 17. The rotor hub 15 is connected either directly or through a gearbox to the generator 19 of the wind turbine for transferring the torque generated by the rotor 15 to the generator 19 and increase the shaft speed in order to achieve a suitable rotational speed of the generator rotor.

The power output from a modern wind turbine is typically controlled by means of a control system for regulating the pitch angle of the rotor blades and the generator torque. The rotor rotational speed and power output of the wind turbine can hereby be initially controlled e.g. before a transfer to a utility grid through a converter.

The basic aim of the methods of operation of variable speed wind turbines is to achieve an operation at the ideal aerodynamic output for as much time as possible.

As it is known, the kinetic energy associated with the incoming wind depends on the area swept by the rotor blades, on the air density and on the cube of the wind speed and it is considered that wind turbines can extract up to 59% of this energy. Accordingly, the capacity of each wind turbine to approach this limit is represented by the so-called power coefficient Cp which is determined by its aerodynamic characteristics, particularly by its tip-speed ratio $\lambda$ which is defined as the relationship between the tangential speed of the blade tip and the speed of the incident wind. If this ratio is kept at its optimal value, so that the rotor speed follows the wind speed, the maximum power coefficient Cp of the wind turbine is obtained, achieving an extremely efficient energy conversion.

The control strategy generally used in variable speed wind turbines is based on electrically adjusting the generator's torque to achieve the maximum output and this is carried out using a controller which receives signals indicating the speed of the generator and the power produced by the generator and which provides a torque reference signal to the converter to obtain the required power.

Accordingly, the wind turbine controller uses a curve which defines the desired functional relationship between power and generator speed to achieve ideal output.

Figure 2:
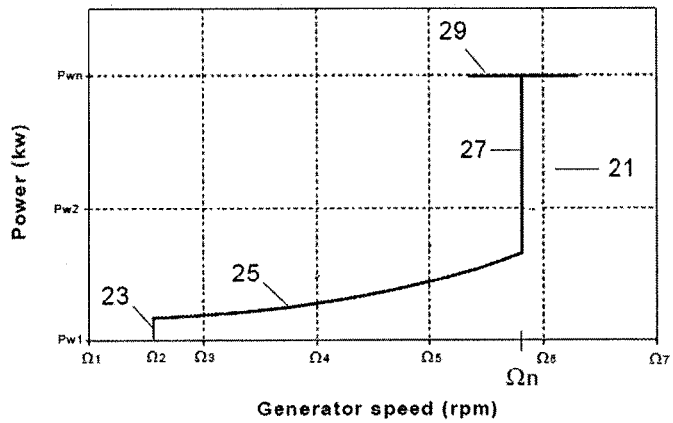
FIG. 2 shows a prior art Power vs. Generator speed curve used for controlling a variable speed wind turbine.
Figure 3:
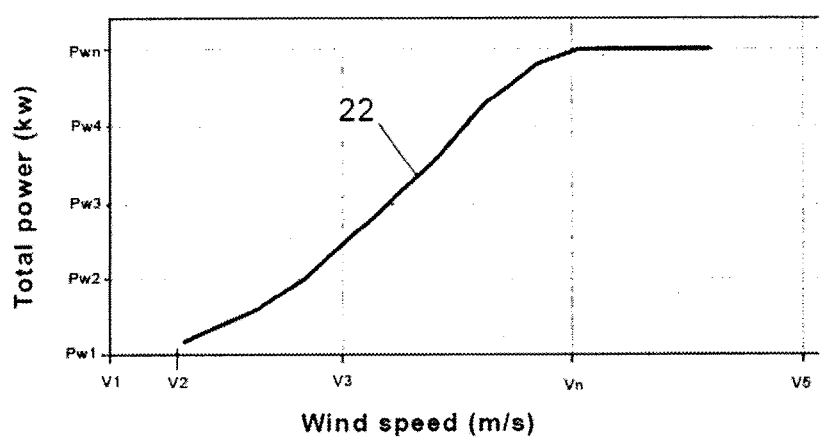
FIG. 3 shows a typical power curve of a wind turbine.

For a better understanding of the present invention a brief description of a typical prior art Power vs. Generator speed 21 shown in FIG. 2 and of the resulting Power vs. Wind speed curve shown in FIG. 3 follows.

The Power vs. Generator speed curve 21 shown in FIG. 2 comprises a first sub-nominal zone 23 where the wind speed attains the minimum level for starting the wind turbine operation. In this zone, the wind turbine control is limited since the wind turbine can not capture the maximum energy. The second sub-nominal zone 25 corresponds to wind speeds in a certain range where generator speed increases and the turbine is running with optimum power coefficient Cp. The third sub-nominal zone 27 corresponds to wind speeds in a certain range where the generator speed is kept constant at the nominal generator speed $\Omega_n$ while power increases up to the nominal power Pwn. Within this zone the pitch angle is fixed and the generator speed is controlled via torque. At the nominal zone 29 the full load wind turbine operation at nominal power Pwn takes place under pitch control to avoid overloads.

In ideal conditions, the resulting average power curve will be curve 22 in FIG. 3 that shows that the power production P increases from a minimum wind speed $V_2$ to the nominal wind speed $V_n$ and then remain constant in the nominal power value Pwn up to the cut-out wind speed. This curve defines the desired functional relationship between power and speed to achieve ideal output and therefore the wind turbine control system shall be accordingly arranged.

For implementing said regulation a control unit receives input data such as wind speed V, generator speed $\Omega$, pitch angle $\theta$, power Pw from well known measuring devices and send output data $\theta_{ref}$, $Tr_{ref}$ to, respectively, the pitch actuator system for changing the angular position of the blades 17 and to a generator command unit for changing the reference for the power production.

Figure 4:
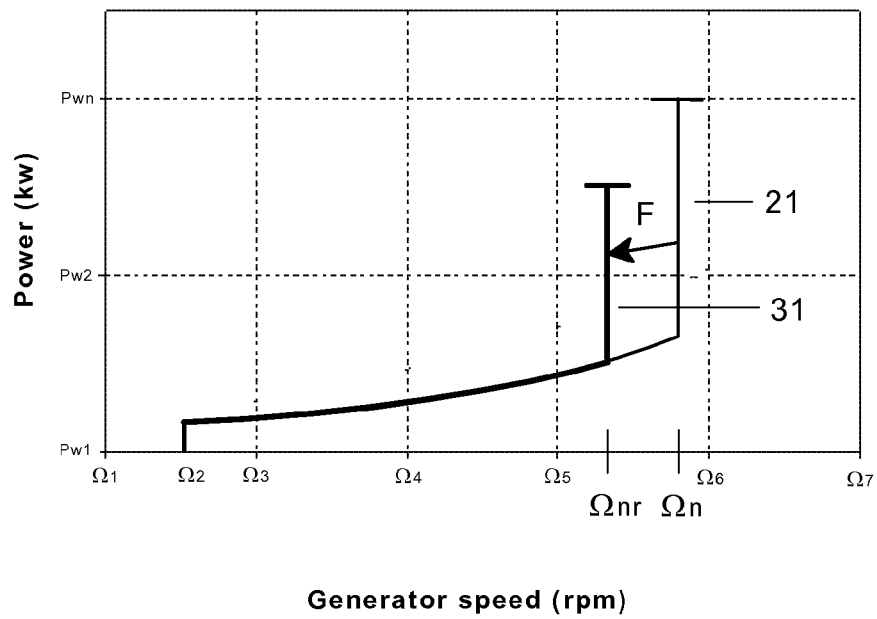
FIG. 4 shows together the prior art Power vs. Generator speed curve of FIG. 2 and a Power vs. Generator speed curve to be used in the additional regulation according to the present invention.
Figure 5:
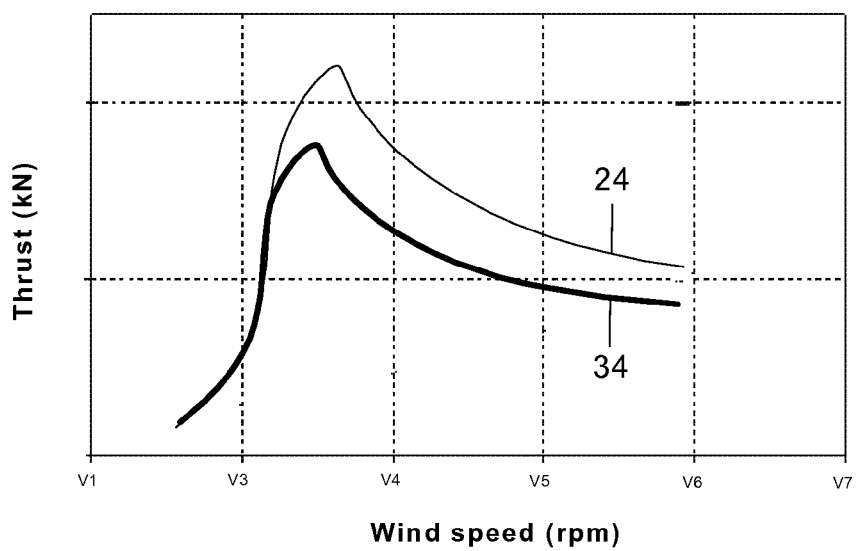
FIG. 5 shows Thrust vs. Wind speed curves corresponding, respectively, to a conventional wind turbine regulation and to the additional regulation according to the present invention.

According to the present invention the control system is also arranged for performing an additional regulation when the wind turbine is subjected to a "cold climate" situation according to a modified Power vs. Generator speed curve such as the curve 31 of FIG. 4 superimposed to the previous mentioned Power vs. Generator speed curve 21. Said modification implies basically a reduction of the nominal generator speed $\Omega_n$ for reducing the extra-loading of the wind turbine in a "cold climate" situation as shown by the Thrust vs Wind Speed curves 24, 34 of FIG. 5 corresponding, respectively, to a wind turbine control system without and with said additional regulation.

As indicated by arrow F the wind turbine may be controlled at a point in the zone 27 of the curve 21 when the additional regulation shall be initiated.

Within the meaning of this invention a "cold climate" situation is a combined condition of temperature and height at the wind turbine site that involves an air density $\rho$ greater than a predetermined value $\rho_{ref}$.

It is considered that a reference value of 1,225 kg/m³ covers the needs of a significant proportion of known wind turbine models. Table 1 illustrates several combinations of height and temperature where $\rho > 1,225$ kg/m³.

TABLE 1

| H(m) | T(° C.) | | | | | | | | | |
|---|---|---|---|---|---|---|---|---|---|---|
| | −30° C. | −25° C. | −20° C. | −15° C. | −10° C. | −5° C. | 0° C. | 5° C. | 10° C. | 15° C. |
| 0 | 1.452 | 1.422 | 1.394 | 1.367 | 1.341 | 1.316 | 1.292 | 1.269 | 1.247 | 1.225 |
| 100 | 1.431 | 1.403 | 1.376 | 1.349 | 1.324 | 1.300 | 1.276 | 1.254 | 1.232 | |
| 200 | 1.412 | 1.384 | 1.357 | 1.332 | 1.307 | 1.283 | 1.260 | 1.238 | | |
| 300 | 1.392 | 1.365 | 1.339 | 1.314 | 1.290 | 1.267 | 1.245 | | | |
| 400 | 1.373 | 1.347 | 1.321 | 1.297 | 1.274 | 1.251 | 1.230 | | | |
| 500 | 1.354 | 1.328 | 1.304 | 1.280 | 1.258 | 1.236 | | | | |
| 600 | 1.335 | 1.311 | 1.287 | 1.264 | 1.242 | | | | | |
| 700 | 1.317 | 1.293 | 1.270 | 1.247 | 1.226 | | | | | |
| 800 | 1.299 | 1.276 | 1.253 | 1.231 | | | | | | |
| 900 | 1.281 | 1.259 | 1.237 | | | | | | | |
| 1000 | 1.264 | 1.242 | | | | | | | | |
| 1100 | 1.247 | | | | | | | | | |
| 1200 | 1.230 | | | | | | | | | |

Figure 6:
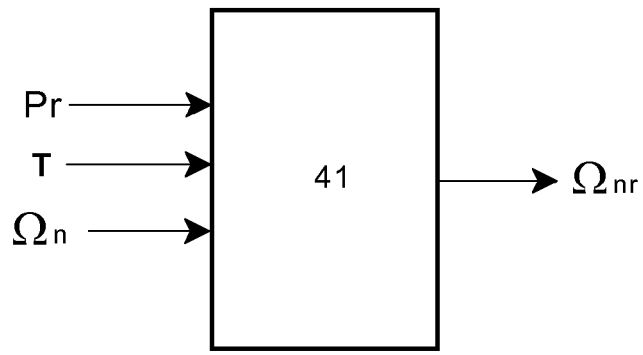
FIG. 6 is a schematic block diagram of the additional regulation according to the present invention.

As shown in FIG. 6 the basic inputs to the control unit 41 that implements said additional regulation are the following ones:

The air pressure Pr at the wind turbine site which can be stored as a data in the control system storing means of the wind turbine, calculated from the height of the wind turbine hub and a table Height vs. Air pressure stored in the control system storing means, or provided to the wind turbine control system by a suitable measuring device located at the wind turbine or outside the wind turbine (typically in the wind park to which the wind turbine belongs).

The temperature T at the wind turbine site which can be provided to the wind turbine control system by a suitable measuring device located at the wind turbine or outside the wind turbine.

The nominal generator speed $\Omega_n$.

The output is the reduced nominal generator speed $\Omega_{nr}$ to be applied in a "cold climate" situation.

Said control unit 31 comprises a module implementing a suitable algorithm for determining the reduced nominal generator speed $\Omega_{nr}$ for decreasing the wind turbine loads to acceptable levels.

Figure 7:
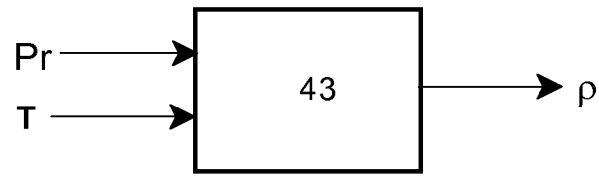
FIGS. 7-8 are detailed block diagrams of an embodiment of the additional regulation according to the present invention.
Figure 8:
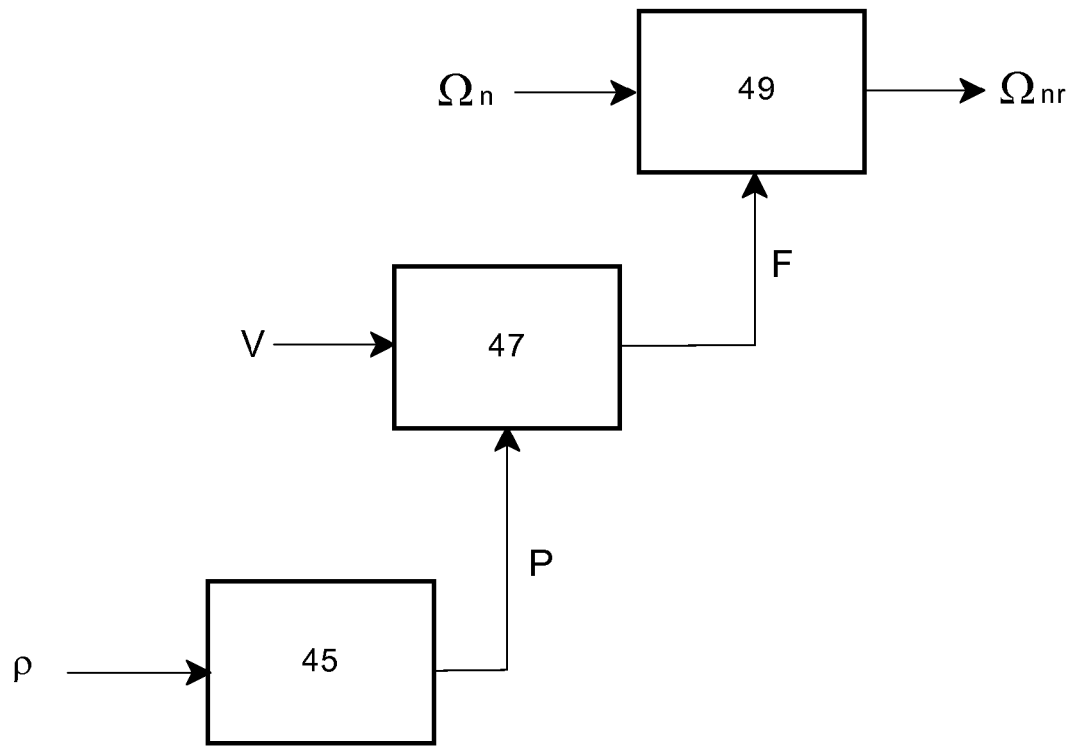

In a preferred embodiment said algorithm is implemented by means of the sub-modules shown in FIGS. 7 and 8.

In the first sub-module 43 shown in FIG. 7 the air density ρ is dynamically calculated as a function of the air pressure Pr and the temperature T.

In the second sub-module (blocks 45, 47, 49 shown in FIG. 8) the reduction factor F to be applied to the nominal generator speed $\Omega_n$ for obtaining the reduced nominal generator speed $\Omega_{nr}$ in block 49, is obtained in block 47 as a function of a reduction parameter P depending of the air density ρ (according to a predetermined interpolation table), obtained in block 45, and of the measured wind velocity V.

In block 47 the reduction factor F is calculated using a dynamical interpolation table for applying in a progressive way the parameter P between two predetermined wind speeds, i.e. the greater the air density ρ is the greater is the subsequent reduction due to the wind speed.

In the environmental conditions defined in Table 1 and according to the simulations performed by the inventors for different wind turbine models the reduced nominal generator speed $\Omega_{nr}$ needed for decreasing the wind turbine loading to the level of standard environmental conditions is comprised between the 70-99.9% of the rated nominal generator speed $\Omega_n$.

The main advantages of the "cold climate" regulation according to the present invention are the following:

It provides a reduction of the damaging effects of the loads in said situation at a low cost because it does not require any hardware modification.

It can be easily implemented in those wind turbines already in operation.

It allows that the control means can react quickly to "cold climate" situations and keep the wind turbine producing energy in a safe mode.

Although the present invention has been fully described in connection with preferred embodiments, it is evident that modifications may be introduced within the scope thereof, not considering this as limited by these embodiments, but by the contents of the following claims.

The invention claimed is:

1. A method for the operation of a variable-speed wind turbine having pitch and torque control means, wherein the torque control means,
   in case of an environmental situation where an air density ρ is greater than a predetermined value ρref, includes additional steps where instead of a rated nominal generator speed Ωn,
   a reduced nominal generator speed Ωnr is determined dynamically as a function of at least an air pressure Pr, a temperature T and a wind speed V, so that wind turbine loading is decreased and wherein the additional steps further comprise the steps of
   calculating dynamically the air density ρ based on the air pressure Pr and the temperature T,
   obtaining a reduction parameter P depending on the value of the air density ρ and based on a predetermined interpolation table,
   obtaining a reduction factor F as a function of said reduction parameter P and of the wind speed V and based on a dynamic interpolation table;
   applying said reduction factor F to the nominal generator speed Ωn to determine the reduced nominal generator speed Ωnr.

2. The method according to claim 1, wherein the values of the air pressure Pr and the temperature T are obtained from one or more sources.

3. The method according to claim 2, wherein the value of the air pressure Pr is obtained from an altitude of the wind turbine hub.

4. The method according to claim 2, wherein the values of the air pressure Pr and the temperature T are obtained from measuring devices placed at the wind turbine and/or outside the wind turbine.

5. The method according to claim 2, wherein when the values of the air pressure Pr and the temperature T are obtained from more than one source, includes additional steps for choosing the value obtained from a predetermined source unless a failure in it is detected.

6. The method according to claim 1, wherein said predetermined value $\rho_{ref}$ is 1,225 kg/m$^3$.

7. The method according to claim 1, wherein the reduced nominal generator speed $\omega_{nr}$ is between 70-99.9% of the rated nominal generator speed $\omega_n$.

8. A wind turbine control system connected to measuring devices of at least a generator speed $\omega$, a pitch angle $\theta$, a temperature T and a wind speed V and to at least to pitch and torque control actuators, the control system being arranged for performing a regulation of the wind turbine according to a predetermined Power vs. Generator speed curve with a nominal generator speed $\omega$n;

the control system being also arranged for performing an additional regulation when an air density $\rho$ is greater than a predetermined value $\rho$ref according to a Power vs. Generator speed curve with a reduced nominal generator speed $\omega$nr, which is determined dynamically as a function of at least an air pressure Pr, the temperature T, and the wind speed V, for decreasing wind turbine loading; and wherein the arrangement for performing said additional regulation comprises a module for obtaining said reduced nominal generator speed $\omega$nr, the module comprising:

a first sub-module for calculating dynamically the air density $\rho$ as a function of the air pressure Pr and the temperature T;

a second sub-module for obtaining the reduced nominal generator speed $\omega$nr by applying a reduction factor F to the nominal generator speed $\omega$n, said reduction factor F being calculated as a function of a reduction parameter P and of the wind speed V and based on a dynamic interpolation table, and said reduction parameter P calculated based on the value of the air density $\rho$ and a predetermined interpolation table.

9. The wind turbine control system according to claim 8, wherein the wind turbine control system is also connected to a measuring device of the air pressure Pr.

10. The wind turbine control system according to claim 8, wherein the measuring devices of the air pressure Pr and the temperature T are placed on the wind turbine and/or in a wind park if the wind turbine belongs to a wind park.

11. The wind turbine control system according to claim 8, wherein said predetermined value $\rho_{ref}$ is 1,225 kg/m$^3$.

12. The wind turbine control system according to claim 8, wherein the reduced nominal generator speed $\omega_{nr}$ is between 70-99.9% of the rated nominal generator speed $\omega_n$.

13. A wind turbine comprising the control system according to claim 8.

* * * * *